United States Patent
Peterson et al.

(10) Patent No.: US 7,451,254 B2
(45) Date of Patent: Nov. 11, 2008

(54) SYSTEM AND METHOD FOR ADAPTIVE BUFFER ALLOCATION IN A MEMORY DEVICE INTERFACE

(75) Inventors: James R. Peterson, Fort Collins, CO (US); Matthew B. Lovell, Longmont, CO (US); Darel N. Emmot, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 834 days.

(21) Appl. No.: 10/631,160

(22) Filed: Jul. 31, 2003

(65) Prior Publication Data
US 2005/0027906 A1    Feb. 3, 2005

(51) Int. Cl.
*G06F 13/12* (2006.01)
(52) U.S. Cl. .............................. 710/52; 710/55; 710/56
(58) Field of Classification Search .................. 710/52, 710/55, 56
See application file for complete search history.

(56) References Cited

U.S. PATENT DOCUMENTS

| | | | | |
|---|---|---|---|---|
| 4,894,770 A | * | 1/1990 | Ward et al. | 711/128 |
| 5,964,859 A | * | 10/1999 | Steinbach et al. | 710/310 |
| 6,404,770 B1 | * | 6/2002 | Fujimori et al. | 370/429 |
| 6,405,256 B1 | * | 6/2002 | Lin et al. | 709/231 |
| 6,708,251 B1 | * | 3/2004 | Boyle et al. | 711/112 |
| 2002/0087758 A1 | * | 7/2002 | Dixon | 710/56 |
| 2004/0054823 A1 | * | 3/2004 | Rooney | 710/33 |
| 2004/0260908 A1 | * | 12/2004 | Malik et al. | 711/213 |
| 2005/0002642 A1 | * | 1/2005 | Minagawa et al. | 386/49 |

\* cited by examiner

*Primary Examiner*—Niketa I Patel (57) ABSTRACT

A method for allocating buffer capacity includes determining at least one characteristic of a first input/output (I/O) device that is coupled to a memory device interface, the memory device interface being configured to enable data transfers between the I/O device and a memory device, and buffering data corresponding to the first I/O device in a first portion of a buffer of the memory device interface, a size of the first portion being responsive to the at least one characteristic of the first I/O device.

15 Claims, 13 Drawing Sheets

SYSTEM AND METHOD FOR ADAPTIVE BUFFER ALLOCATION IN A MEMORY DEVICE INTERFACE

BACKGROUND

A memory device interface (MDI) is often used as an interface between a memory device and an input/output (I/O) device. The MDI may be coupled to a plurality of I/O devices via respective slots in the MDI. Each MDI slot may comprise one or more I/O links. The rate of data transfer that may be achieved by an I/O device via a traditional MDI is limited by the fixed buffer capacity that is allocated to the I/O link(s) used by the I/O device. As a result an I/O device may experience unacceptable delays and/or errors associated with writing data to and/or reading data from a memory device. Therefore, there exists a need for improved systems and methods for addressing these and/or other problems associated with memory device interfaces.

SUMMARY

A preferred embodiment of a method for allocating buffer capacity in a memory device interface includes determining at least one characteristic of a first input/output (I/O) device that is coupled to a memory device interface, the memory device interface being configured to enable data transfers between the I/O device and a memory device, and buffering data corresponding to the first I/O device in a first portion of a buffer of the memory device interface, a size of the first portion being responsive to the at least one characteristic of the first I/O device.

A preferred embodiment of a memory device interface includes a buffer, a first plurality of registers that are configured to enable the memory device interface to buffer in a first portion of the buffer data corresponding to a first I/O device, and a second plurality of registers that are configured to enable the memory device interface to buffer in a second portion of the buffer data corresponding to a second I/O device, a size of the first portion of the buffer being different than a size of the second portion of the buffer.

BRIEF DESCRIPTION OF THE DRAWINGS

Systems and methods for adaptive buffer allocation are illustrated by way of example and not limited by the implementations illustrated in the following drawings. The components in the drawings are not necessarily to scale, emphasis instead is placed upon clearly illustrating the principles of the present invention. Moreover, in the drawings, like reference numerals designate corresponding parts throughout the several views.

DETAILED DESCRIPTION

According to an embodiment of the invention, a memory device interface includes buffer capacity that is dynamically allocated to data received from respective input/output (I/O) devices. For example, a larger portion of a buffer may be allocated to data received from a first I/O device, whereas a smaller portion of the buffer may be allocated to data received from a second I/O device. This and other embodiments of the invention will be described in more detail below with reference to the accompanying figures.

Figure 1A:
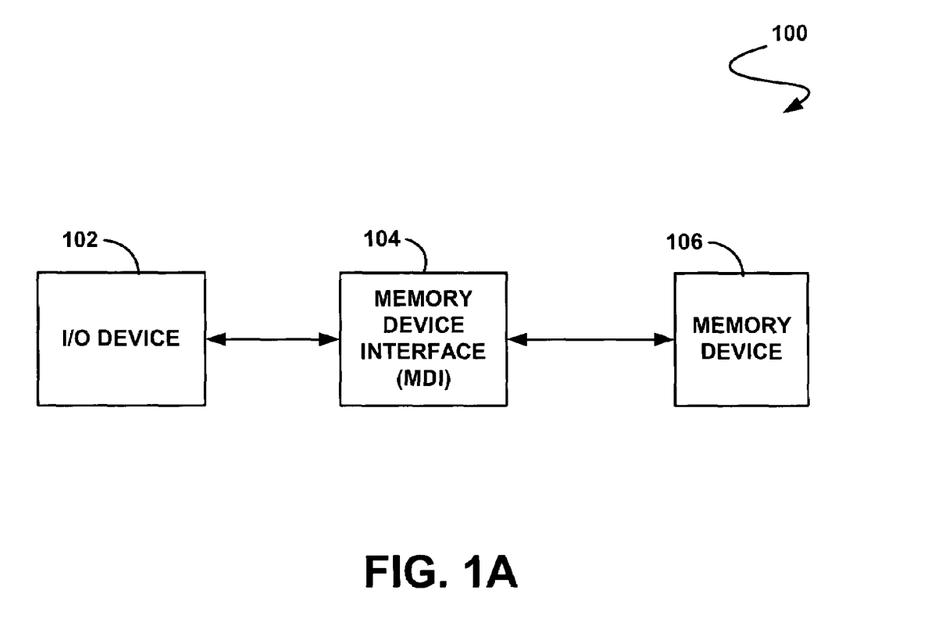
FIG. 1A is a block diagram of an adaptive buffer allocation system according to an embodiment of the present invention.

FIG. 1A is a block diagram of a data transfer system 100 in accordance with one embodiment of the present invention. The data transfer system 100 comprises a I/O device 102 and a memory device 106 that are coupled to a memory device interface (MDI) 104. In one embodiment, the memory device 106, the MDI 104, and/or the I/O device 102 may be integrated into a single device (e.g., a computer). The MDI 104 enables read and write data transfers between the I/O device 102 and the memory device 106. For example, in a write operation, data is transferred from the I/O device 102 to the memory device 106 via the MDI 104. Similarly, in a read operation, data is transferred from the memory device 106 to the I/O device 102 via the MDI 104.

In one implementation, among others, the memory device 106 comprises dynamic random-access memory (DRAM), and the MDI 104 is configured to be compatible with Peripheral Component Interconnect Express (PCI Express) architecture. Examples of an I/O device 102 that may be coupled to the MDI 104 include, for example, a graphics rendering device, a communication device (e.g., an Ethernet card), and a storage device controller (e.g., a hard disk controller), among others.

Figure 1B:
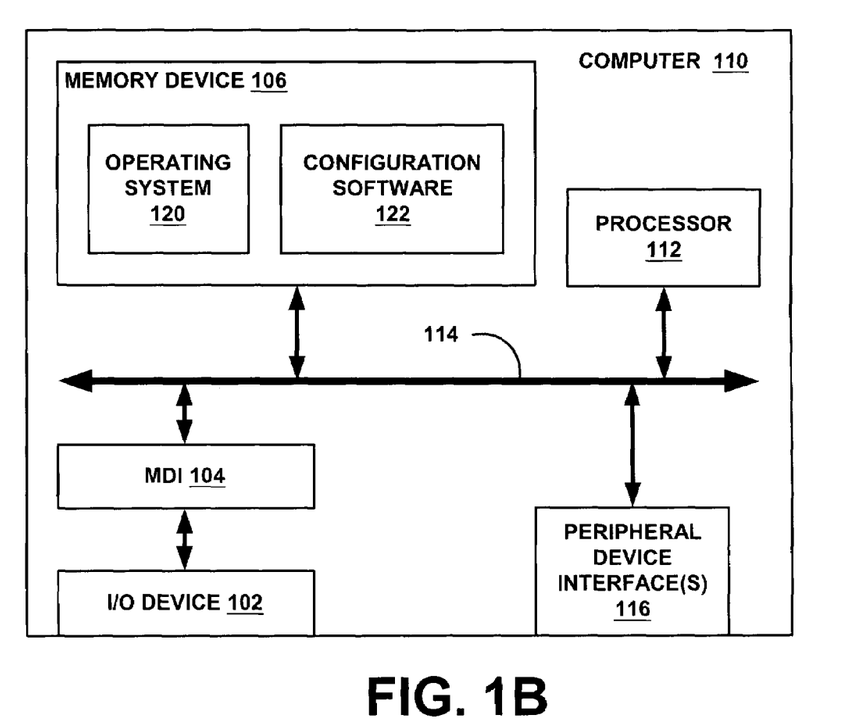
FIG. 1B is a block diagram of a computer in which the adaptive buffer allocation system of FIG. 1A may be implemented, according to an embodiment of the present invention.

FIG. 1B is a block diagram of a computer 110 in which the data transfer system 100 (FIG. 1A) may be implemented, according to an embodiment of the present invention. The computer 110 may be, for example, among others, a desktop computer, a notebook computer, a workstation, a minicomputer, a personal digital assistant (PDA), or a mainframe computer, among others.

Generally, in terms of hardware architecture, as shown in FIG. 1, the components of the computer 110 include a processor 112, peripheral device interfaces 116, an MDI 104, and a memory device 106. These components (112, 116, 104, and 106) may be communicatively coupled via a local interface 114, which may comprise, for example, one or more buses or other wired or wireless connections. The MDI 104 is coupled to an I/O device 102, and facilitates data transfers between the I/O device 102 and the memory device 106. The local interface 114 may have additional elements, which are omitted for simplicity, such as controllers, buffers (caches), drivers, repeaters, and receivers, to enable communications.

The processor 112 is a hardware device for executing software, particularly that stored in the memory device 106. The processor 112 can be any custom made or commercially available processor, a central processing unit (CPU), an auxiliary processor among several processors associated with the computer 110, a semiconductor based microprocessor (in the form of a microchip or chip set), or generally any device for executing software instructions. When the computer 110 is in operation, the processor 112 is configured to execute software stored within the memory device 106, to communicate data to and from the memory device 106, and to generally control operations of the computer 110 pursuant to the software.

The peripheral device interfaces 116 may be used to communicate with one or more peripheral devices including, for example, a printer, a copier, a keyboard, a mouse, and/or a monitor, etc. The peripheral device interfaces 116 may include, for example, a serial port, a parallel port, a Small Computer System Interface (SCSI), an infra-red (IR) interface, a radio-frequency (RF) interface, and/or a universal serial bus (USB) interface, among others.

The memory device 106 can include any one or combination of volatile and/or non-volatile memory elements now known or later developed. For example, the memory device 106 may comprise random access memory (RAM), read only memory (ROM), a hard disk, a tape, and/or a compact disk ROM (CD-ROM), among others. Note that the memory device 106 can have a distributed architecture, where various components are situated remote from one another, but can be accessed by the processor 112. In a preferred embodiment, the memory device 106 comprises DRAM.

The software applications in the memory device 106 include an operating system (OS) 120 and configuration software 122. The OS 120 essentially controls the execution of the other applications, and provides scheduling, input-output control, file and data management, memory management, and/or communication control, among other functionality. The configuration software 122 may be used to configure the I/O device 102 and/or the MDI 104. The configuration software 122 may be a source program, an executable program (e.g., object code), a script, or any other entity comprising a set of instructions to be executed.

The configuration software 122 can be embodied in any computer-readable medium for use by or in connection with an instruction execution system, apparatus, or device, such as a computer-based system or a processor-containing system. In the context of this disclosure, a "computer-readable medium" can be any means that can store, communicate, propagate, or transport a program for use by or in connection with the instruction execution system, apparatus, or device. The computer-readable medium can be, for example, among others, an electronic, magnetic, optical, electromagnetic, infrared, or semiconductor system, apparatus, device, or propagation medium now known or later developed.

Figure 2A:
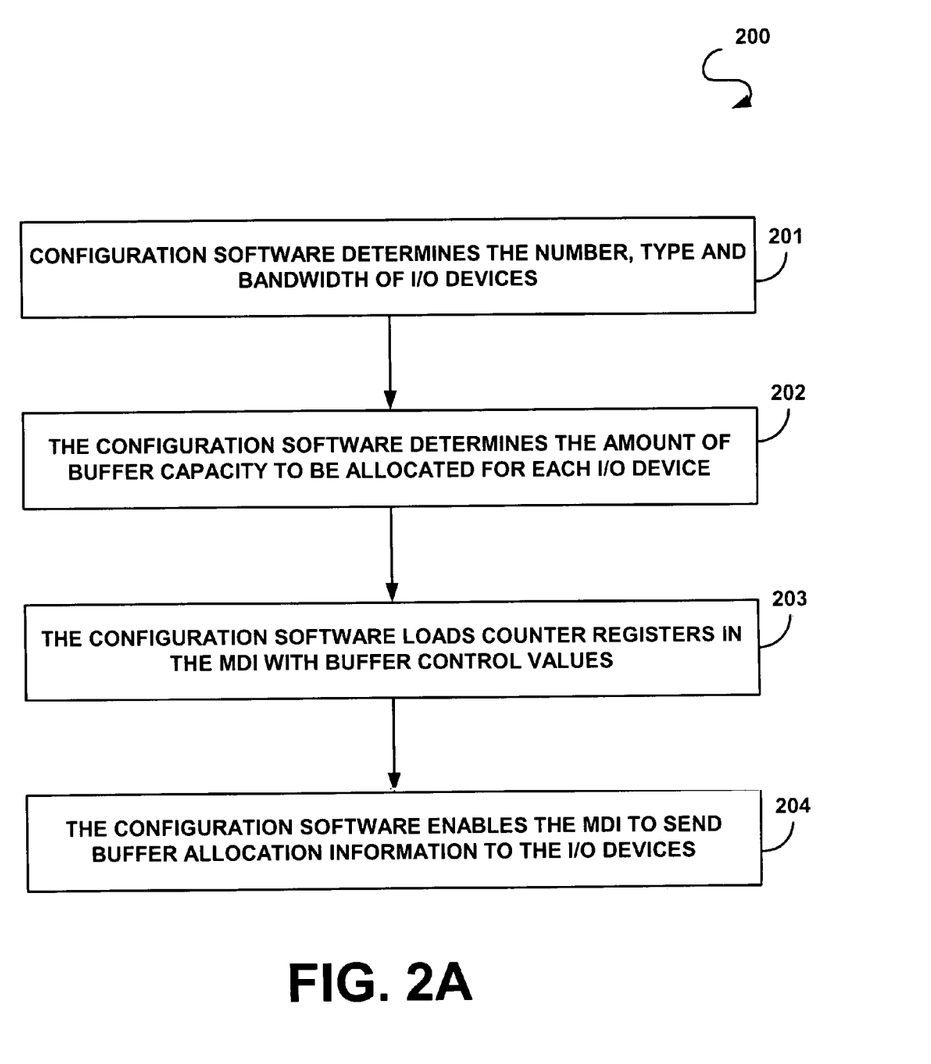
FIG. 2A is a flow chart depicting a method for configuring an adaptive buffer allocation system, according to an embodiment of the invention.

FIG. 2A is a flow chart depicting a method 200 for configuring an adaptive buffer allocation system 100 (FIG. 1A), according to an embodiment of the invention. In step 201, configuration software 122 (FIG. 1B) determines the number, type and bandwidth of I/O devices 102 (FIG. 1A) that are coupled to the MDI 104 (FIG. 1A). The configuration software 122 then determines the amount of buffer capacity to be allocated for each I/O device 102, as indicated in step 202. Factors or characteristics that may be evaluated in determining the amount of buffer capacity to be allocated include, for example:

1) The rate at which an I/O device 102 is able to read and write data. The greater the rate, the more buffer capacity may be allocated.

2) The bandwidth of the link between an I/O device 102 and the MDI 104. The greater the bandwidth, the more buffer capacity may be allocated.

3) The size of the data units that an I/O device reads and writes from/to the memory device 106 per read or write request. The greater the size of the data units, the more buffer capacity may be allocated.

4) The tolerance that an I/O device 102 has for delays by the MDI 104 in fulfilling a read or write request from the I/O device 102. Some I/O devices 102 (e.g., a video camera) may lose data if not enough buffer capacity is allocated. Therefore, the lower the tolerance that an I/O device 102 has for delays in the fulfillment of a read or write request, the more buffer capacity may be allocated.

After the configuration software 122 determines the amount of buffer capacity to be allocated for each I/O device 102, the configuration software 122 loads counter registers in the MDI 104 with buffer control values, as indicated in step 203. These buffer control values, enable the MDI 104 to provide predetermined buffer capacities to respective I/O devices 102. Furthermore, the configuration software 122 enables the MDI 104 to send buffer allocation information to the I/O devices 102, as indicated in step 204. This buffer allocation information enables the I/O devices 102 to perform read and write operations via the MDI 104 at a rate that is responsive to the buffer capacity allocated to the respective I/O devices 102.

Figure 2B:
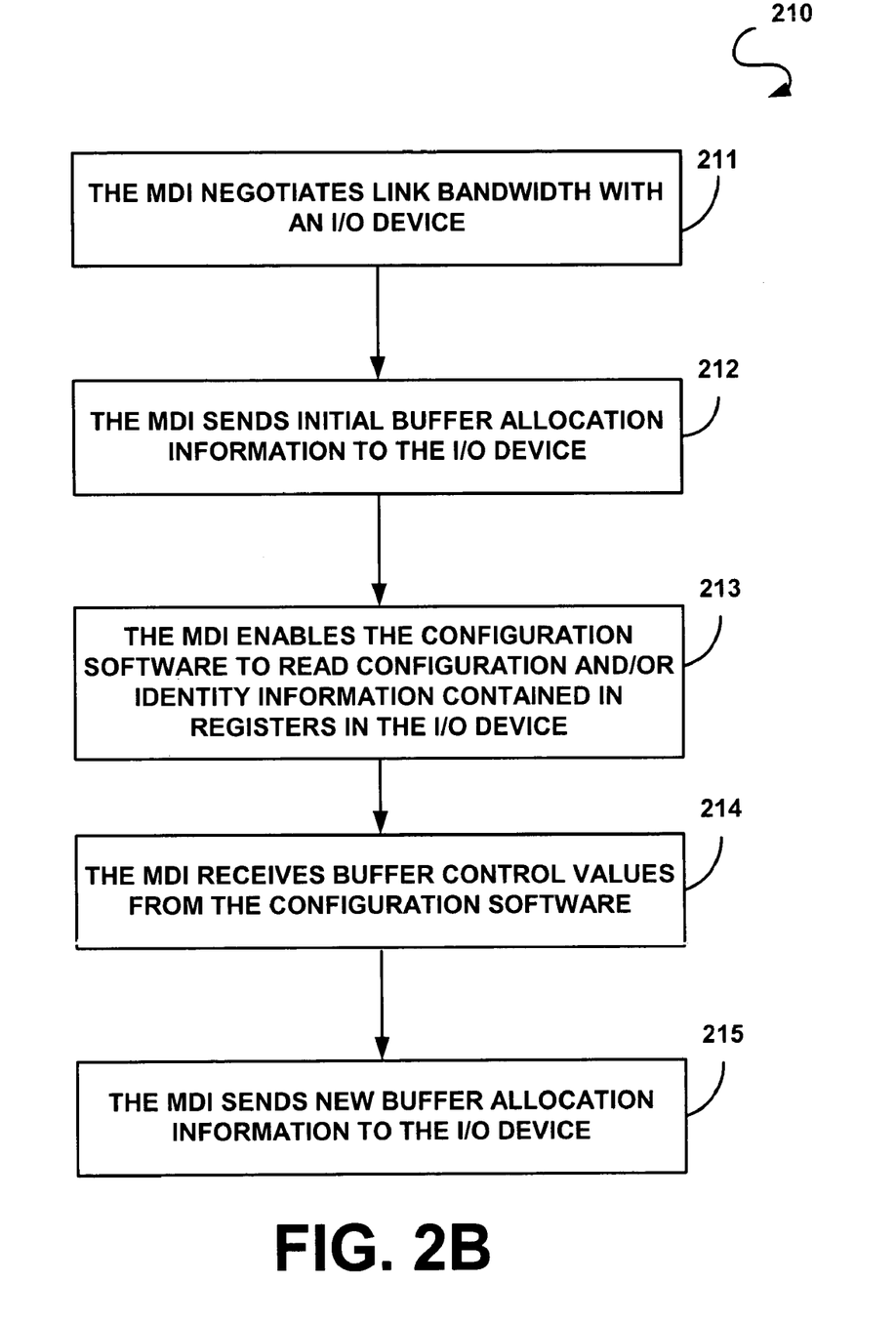
FIG. 2B is a flow chart depicting a method for configuring an adaptive buffer allocation system, according to an embodiment of the invention.

FIG. 2B is a flow chart depicting a method 210 for configuring an adaptive buffer allocation system 100 (FIG. 1A), according to an embodiment of the invention. In step 211, the MDI 104 (FIG. 1A) negotiates link bandwidth with an I/O device 102 (FIG. 1A). The negotiation process may occur at power-on and may be performed in accordance with, for example, a PCI Express specification. After the link bandwidth is determined, the MDI 104 sends initial buffer allocation information to the I/O device 102, as indicated in step 212. This buffer allocation information enables the I/O device 102 to perform read and write operations via the MDI 104 at a rate that is responsive to the buffer capacity allocated to the I/O device 102. The MDI 104 then enables the configuration software 122 (FIG. 1B) to read configuration and/or identity information contained in registers within the I/O device 102, as indicated in step 213. The MDI 104 then receives buffer control values from the configuration software 122, as indicated in step 214. These buffer control values are loaded in counter registers used to control buffer usage in the MDI 104. After the buffer control values are loaded in the counter registers, the MDI 104 sends new buffer allocation information to the I/O device 102, as indicated in step 215.

Figure 3:
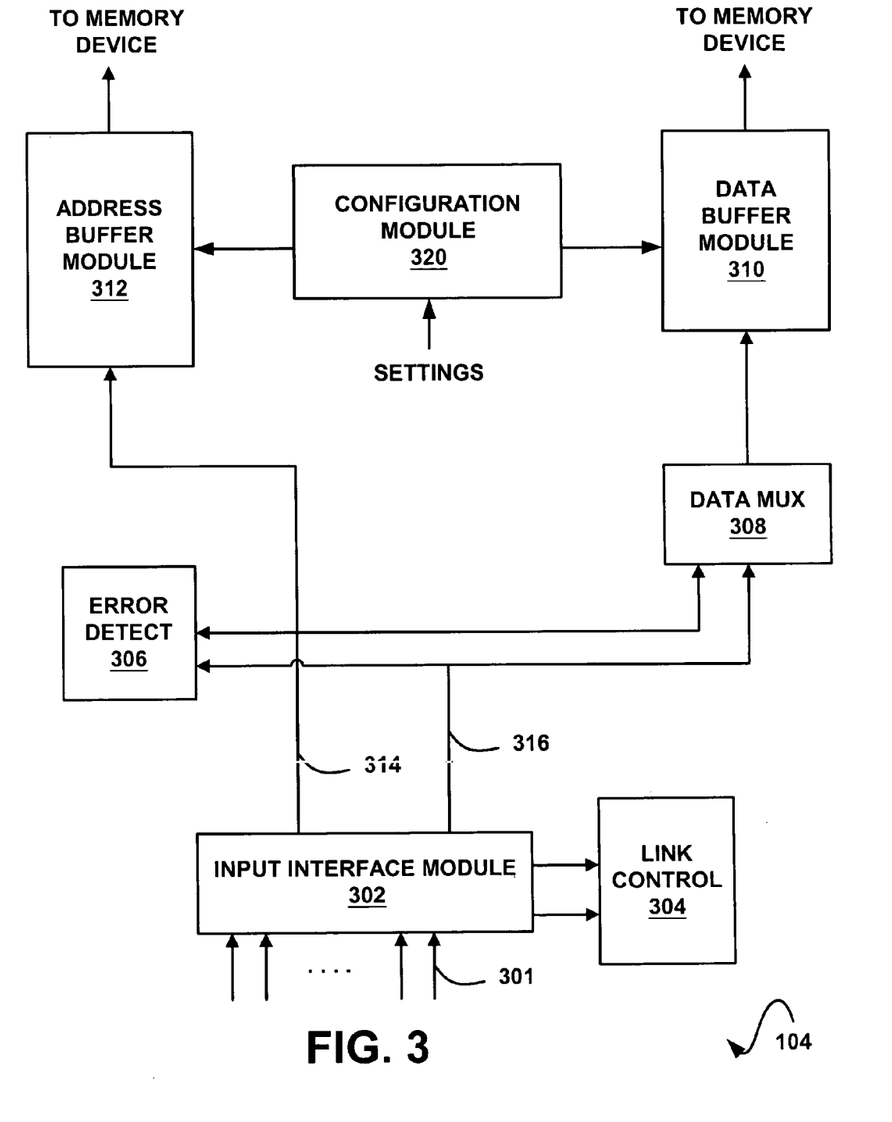
FIG. 3 is a block diagram depicting an MDI, according to an embodiment of the invention.

FIG. 3 is a block diagram depicting an MDI 104, according to an embodiment of the invention. Input links 301 provide data input to the MDI 104. Each input link 301 may comprise one or more input lanes. In one implementation, an input link may comprise 1, 2, 4, 8, or 16 input lanes. If the MDI 104 is configured to be compatible with PCI Express architecture, then each input lane may comprise a single pair of differential wires.

Each data packet received by the MDI 104 may contain link-control information, a memory read address, a memory write address, and payload data. The MDI 104 processes each data packet prior to loading corresponding data into the memory device 106 (for a write operation), or transferring corresponding data to an I/O device 102 (for a read operation).

The MDI 104 includes an input-interface module 302, an error detect module 306, an address-buffer module 312, a data-buffer module 310, and a link-control module 304. The input-interface module 302 receives data over a period time and builds up a complete address or data unit (typically 16-bytes) to be loaded into an address-buffer module 312 or a data-buffer module 310.

The error detect module 306 determines if a data packet contains any errors. For PCI Express architecture, this may be done using 32 or 16 bit cyclical redundancy check (CRC) values (16 bit CRC values are used to protect link-control messages, and 32 bit CRC values are used to protect memory read and write requests). Data corresponding to a certain packet is preferably not stored in the memory device 106 until the entire packet is determined to be free of errors.

The address-buffer module 312 holds addresses that are used for memory reads or writes, along with data length information. The address-buffer module 312 can preferably hold multiple addresses. The data-buffer module 310 holds data that is to be written to the memory device 106. The storage capacity of the data-buffer module 310 is preferably large enough to accommodate any data packet that is to be received by the MDI 104.

The link-control module 304 keeps track of link flow control status. For PCI Express architecture, the link-control module 304 can request that packets containing CRC errors be re-sent by an I/O device 102 to the MDI 104. In one implementation, the link-control module 304 monitors 16 links, and is able to process two link-control messages during each clock cycle.

The MDI 104 includes data buses 314 and 316. In one implementation, data bus 314 is used for carrying 12 or 16-byte units of payload data, whereas data bus 316 is used for carrying 4 or 8-byte units of payload data. The data multiplexer 308 selects which data bus (314 or 316) is written into the data-buffer module 310 during a given clock cycle. It is possible that an address value be carried by data bus 314 while payload data leftover from an odd-sized data packet be carried by data bus 316.

A configuration module 320 uses settings data received from the configuration software 122 to configure counters in the address-buffer module 312 and the data-buffer module 310. These counters manage buffer capacity allocation in their respective modules (312 or 310).

Figure 4A:
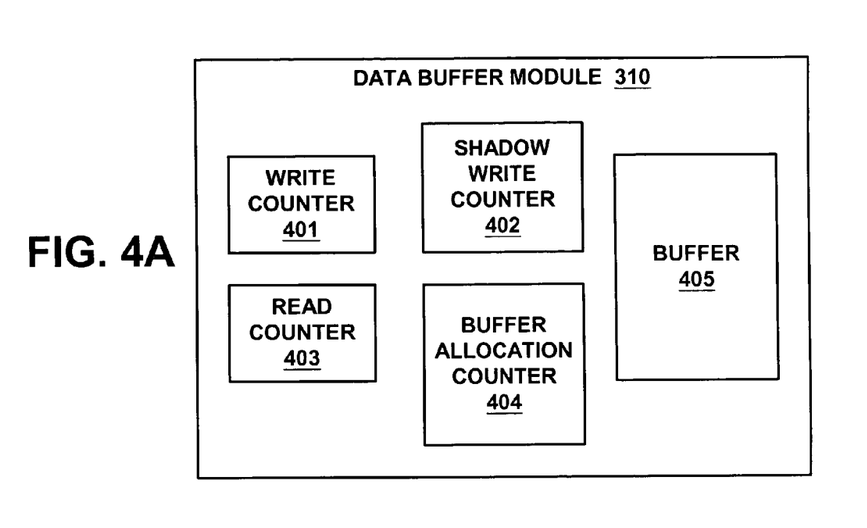
FIG. 4A is a block diagram of a data-buffer module, according to an embodiment of the invention.

FIG. 4A is a block diagram of a data-buffer module 310, according to an embodiment of the invention. The data-buffer module 310 includes a buffer 405 and counters 401-404 that are used in managing the buffer 405. The buffer 405 preferably comprises random access memory (RAM). The data-buffer module 310 preferably includes a set of counters 401-404 for each link 301 (FIG. 3). For example, if there are 16 links 301, then there are preferably 16 sets of counters 401-404.

A write counter 401 is incremented when data corresponding to a certain link 301 is loaded into the buffer 405. The write counter 401 preferably begins at a certain lower limit value. When the write counter 401 reaches a certain upper limit value, it returns to the certain lower limit value the next time that the write counter 401 is incremented. In one implementation, the certain lower limit value corresponds to the lowest buffer address that may be occupied by data received via a certain link, and the certain upper limit value corresponds to the highest buffer address that may be occupied by data received via such link.

The shadow-write counter 402 points to the beginning of a packet (received via a certain link 301) that is stored in the buffer 405. If the packet contains an error, the write counter 401 is set back to the value in the shadow-write counter 402. As a result, the data-buffer module 310 can proceed as if the packet containing the error was never received. If a received packet does not contain an error, then the shadow-write counter 402 is set equal to the write counter 401.

A read counter 403 is used to determine the next buffer address to be read out from the buffer 405 and sent to the memory device 106. Like the write counter 401, the read counter 403 is reset to the lower limit value corresponding to a certain link. The value of write counter 401 minus the value of the read counter 403 represents the amount of live data in the buffer 405 corresponding to a certain link. The value of the shadow-write counter 402 minus the value of the read counter 403 represents an amount of data (corresponding to a certain link) in the buffer 405 that is available to be processed by the data-buffer module 310.

A buffer allocation counter 404 specifies a buffer allocation value that is used in allocating buffer capacity of the buffer 405 to data received via a certain link 301. At reset, the value of the buffer allocation counter 404 is set equal to a certain upper limit value minus a certain lower limit value. As mentioned above, this certain lower limit value corresponds to the lowest buffer address that may be occupied by data received via a certain link, and the certain upper limit value corresponds to the highest buffer address that may be occupied by data received via such link.

The value stored in the buffer allocation counter 404 is decremented as buffer allocation values are sent to the I/O device 102, and is incremented as data is read from a portion of the buffer 405 corresponding to the I/O device 102. The I/O device 102 has a complementary buffer allocation counter (not shown) that is incremented by buffer allocation values received from the MDI 104, and that is decremented as data is sent to the MDI 104. In one implementation, the I/O device 102 provides data to the MDI 104 only if the complementary buffer allocation counter in the I/O device 102 has a buffer allocation value greater than zero. When buffer capacity is re-allocated among I/O devices 102 (e.g., pursuant to the configuration software 122), the buffer allocation counter 404 is set equal to a value that represents the buffer capacity that is assigned to a corresponding link 301.

Figure 4B:
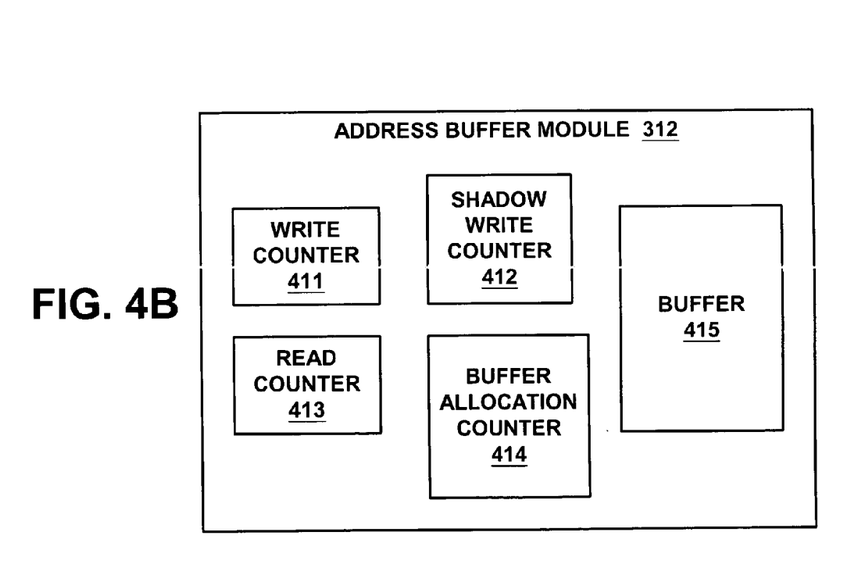
FIG. 4B is a block diagram of an address-buffer module, according to an embodiment of the invention.

FIG. 4B is a block diagram of an address-buffer module 312, according to an embodiment of the invention. The address-buffer module 312 includes a buffer 415 and counters 411-414 that are used in managing the buffer 415. The buffer 415 preferably comprises RAM. The address-buffer module 312 preferably includes one set of counters 411-414 corresponding to each link 301 (FIG. 3) that is coupled to the MDI 104. For example, if there are 16 links 301, then there are preferably 16 sets of counters 411-414. Each set of counters 411-414 preferably operates in a similar manner to the set of counters 401-404 (FIG. 4A). For example, a write counter 411 is incremented when data corresponding to a certain link 301 is loaded into the buffer 415; a shadow-write counter 412 points to the beginning of a packet (corresponding to a certain link 301) that is stored in the buffer 415; a read counter 413 is used to determine the next buffer address to be read out from the buffer 415 and sent to the memory device 106; and a buffer allocation counter 414 specifies a buffer allocation value that is used in allocating buffer capacity of the buffer 415 to data received from the I/O device 102.

Figure 5:
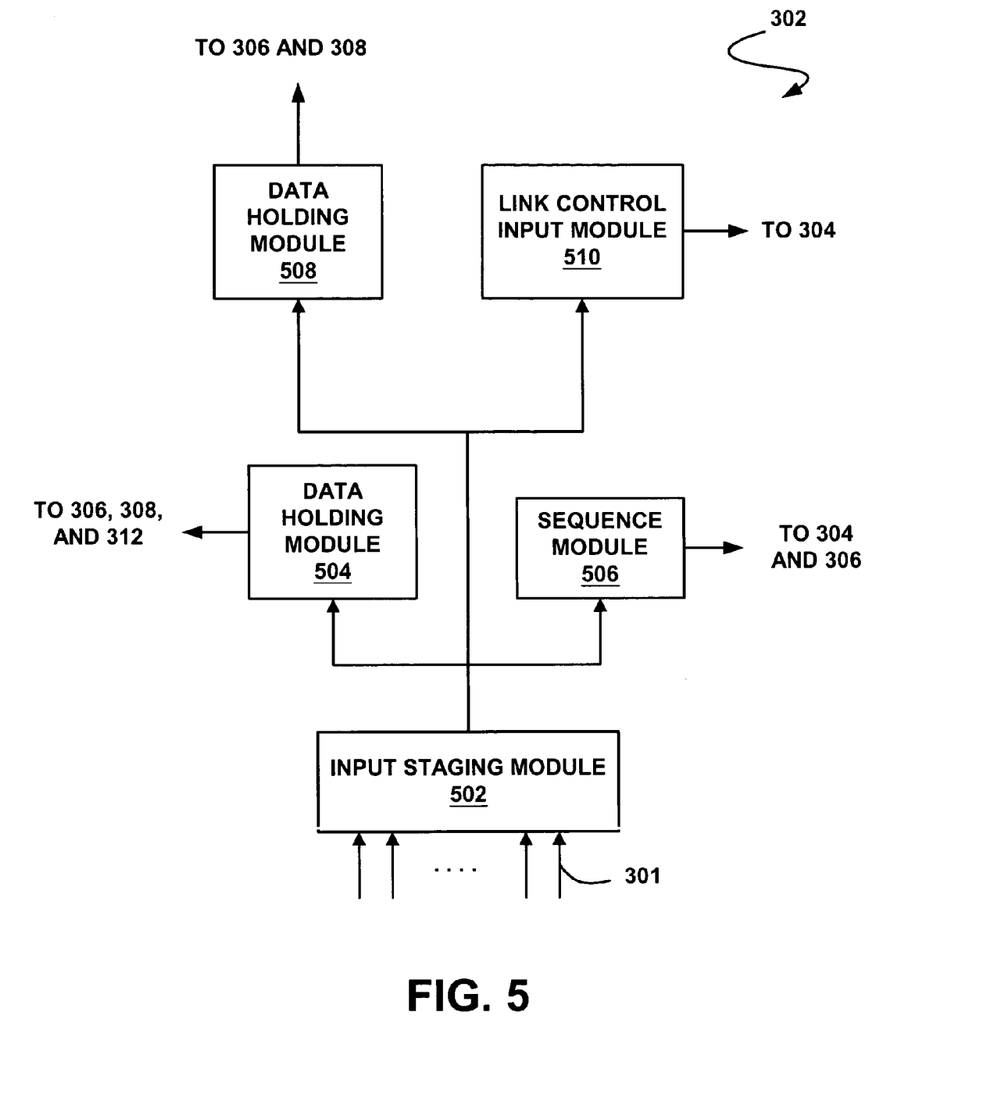
FIG. 5 is a block diagram depicting components of the input-interface module shown in FIG. 3, according to an embodiment of the invention.

FIG. 5 is a block diagram depicting components of an input-interface module 302. The input-interface module 302 includes an input-staging module 502 for holding data while it is being assembled into larger groups. In one implementation, the input-staging module 502 comprises 16 shift registers for holding data received from up to 16 respective input links 301. The input-staging module provides data to a data-holding module 504, to a sequence module 506, to a data-holding module 508, and to a link-control-input module 510.

The data-holding module 504 receives data from the input-staging module 502 and holds the data prior to forwarding certain portions of the data to the error detect module 306, the data multiplexer 308, and the address-buffer module 312 (FIG. 3), respectively. In one implementation, the data-holding module 504 includes sixteen 16-byte registers, each of which may hold a 16-byte PCI Express header (e.g., an address) or payload data (e.g., 12 or 16-byte data units).

The sequence module 506 receives sequence numbers (e.g., PCI express sequence numbers that are included in memory read or memory write packets) from the input-staging module 502. The sequence module 506 then forwards the sequence numbers to the error detect module 306 and the link-control module 304 (FIG. 3). In one implementation, the sequence module includes sixteen 2-byte registers, each of which may hold a 2-byte sequence number.

The data-holding module 508 receives CRC data from the input-staging module 502 and holds the CRC data prior to forwarding it to the error detect module 306. The data-holding module 508 also receives payload data from the input-staging module 502 and holds the payload data prior to forwarding it to the data multiplexer 308 (FIG. 3). In one implementation, the data-holding module 508 includes sixteen 12-byte registers for holding data.

The link-control-input module 510 receives link-control messages from the input-staging module 502 and forwards the link-control messages to the link-control module 304 (FIG. 3). In one implementation, the data-holding module 508 includes sixteen 6-byte registers for holding link-control data.

Figure 6A:
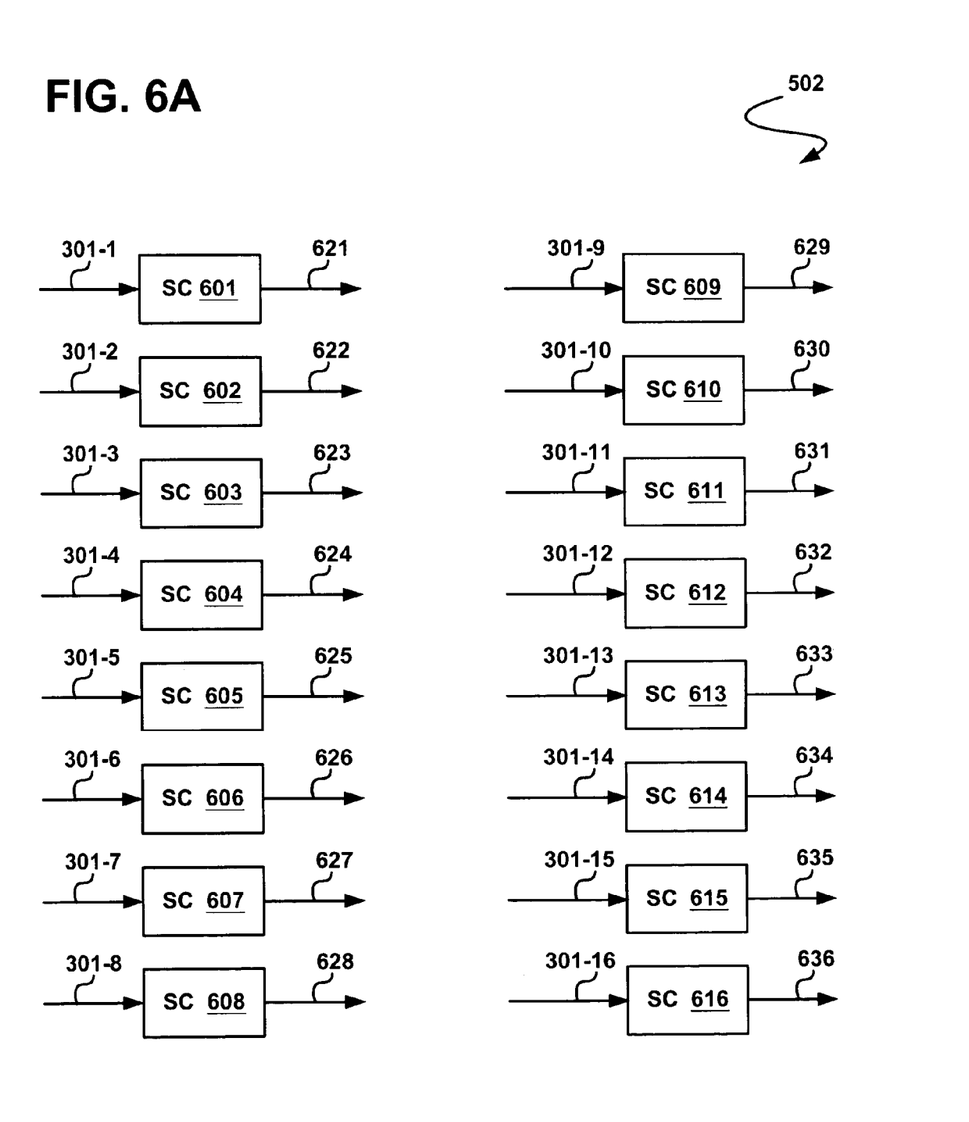
FIG. 6A is a block diagram depicting the input-staging module shown in FIG. 3, according to an embodiment of the invention.

FIG. 6A is a block diagram depicting an input-staging module 502. The input-staging module 502 includes input-staging circuits 601-616. The input-staging circuits 601-616 receive inputs via input links 301-1, 301-2, . . . , 301-16 and provide corresponding outputs 621-636, respectively. In one implementation, the inputs received via links 301-2, 301-4, 301-6, 301-8, 301-10, 301-12, 301-14, and 301-16 comprise 1 byte per clock signal; the inputs received via links 301-3, 301-7, 301-11, and 301-15 comprise 1 or 2-bytes per clock signal; the inputs received via links 301-5 and 301-13 comprise 1, 2, or 4-bytes per clock signal; the input received via link 301-1 comprises 1, 2, 4, 8, or 16-bytes per clock signal; and the input received via link 301-9 comprises between 1, 2, 4, or 8-bytes per clock signal.

Figure 6B:
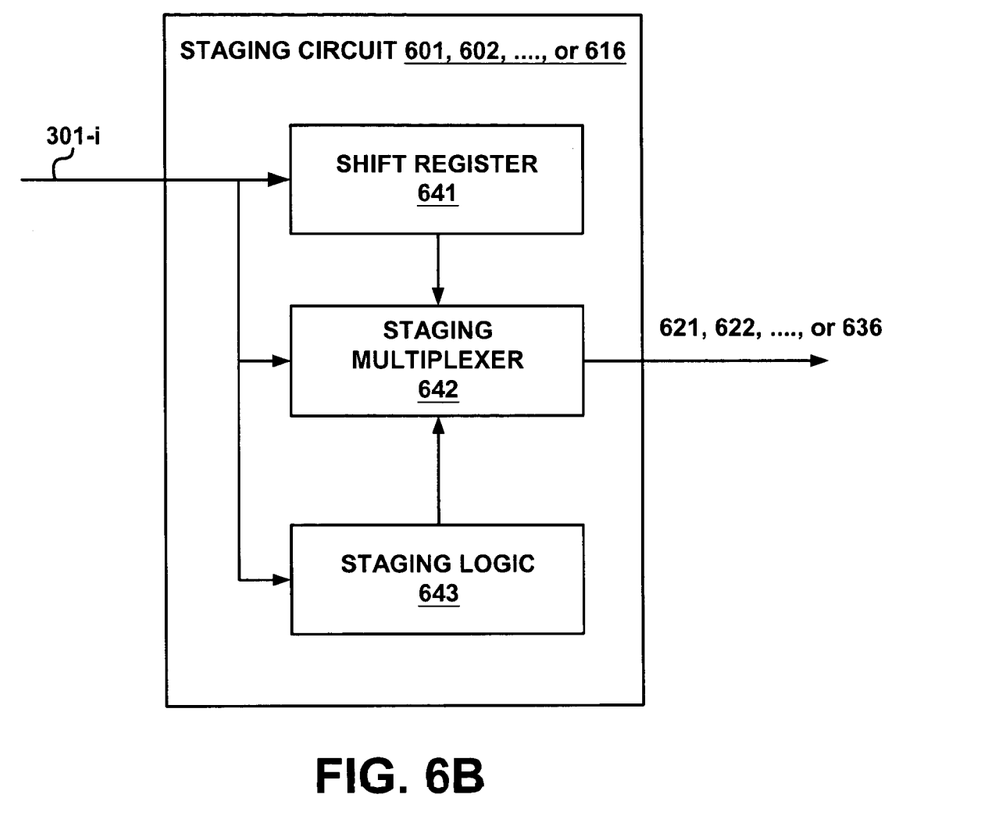
FIG. 6B is a block diagram depicting an input-staging circuit shown in FIG. 6A.

FIG. 6B is a block diagram depicting an input-staging circuit 601, . . . , or 616.

Each shift register 641 shifts a byte by either 0, 1, 2, 4, or 8 bits during each clock signal, depending upon the link width and whether data is available. In one implementation, the number of bytes shifted by a shift register 641 per clock signal is equal to the corresponding link width in bytes. However, for a 16× link, a shift register 641 simply holds a current set of 16-bytes until the next set of 16-bytes is received.

The staging multiplexer 642 combines input data with data from the shift register 641 to provide input for a 16-byte data register, a 12-byte data register, or a link-control message register. The staging multiplexer 642 also shifts 12-byte headers over 4-bytes to make them compatible with 16-byte headers.

In order to support a requirement that data not be carried by both a 16-byte bus and a 12-byte bus during any given clock signal, an input-staging circuit 601, . . . , or 616 will preferably not write the final 4 or 8-bytes plus CRC bytes to the 12-byte register for at least a certain number of clock signals after writing data to the 16-byte register. The certain number of clock signals being equal to 16/the number of input lanes per link.

The staging logic 643 includes a start/end detect circuit, data counters and state logic (not shown). The start/end detect circuit searches for start and end symbols in data packets. The data counters determine how many bytes of a field in a packet have been received, and how much data the packet has. The state logic remembers the packet type, and the part of the packet (e.g., header, data, or CRC) being received (e.g., header, data, or CRC).

Figure 7:
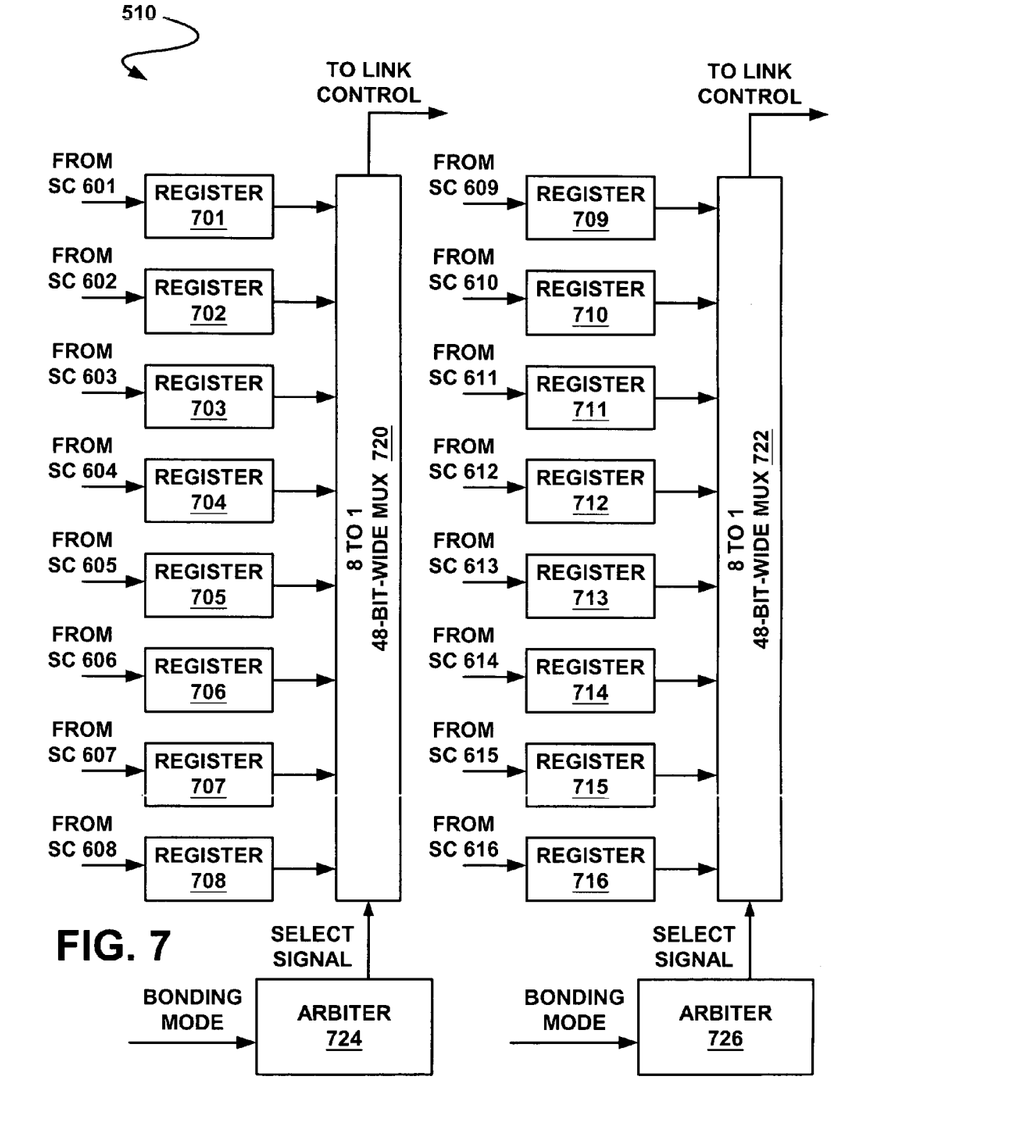
FIG. 7 is a block diagram depicting an embodiment of the link-control-input-circuit shown in FIG. 5, according to an embodiment of the invention.

FIG. 7 is a block diagram depicting an embodiment of a link-control-input module 510. The link-control-input module 510 comprises registers 701-716, multiplexers 720 & 722, and arbiters 724 & 726. The multiplexer 720 is coupled to the registers 701-708, and the multiplexer 722 is coupled to the registers 709-716. Each of the multiplexers is preferably an 8-to-1, 48-bit-wide multiplexer, and each of the arbiters 724 & 726 is preferably an 8-channel round-robin weighted arbiter.

Each of the registers 701-716 receives a 6-byte link-control message from a respective one of the input-staging circuits 601-616 (FIG. 6). Each of the multiplexers 720 & 722 selects link-control message(s) stored in respective registers and passes the message(s) to the link-control module. The arbiters 724 & 726 receive bonding mode signals and provide select signals to the multiplexers 720 & 722, respectively. The arbiters 724 & 726 select a register corresponding to a 1× link every 8 clock signals, a register corresponding to a 2× link every 4 clock signals, a register corresponding to a 4× link every 2 clock signals, and a register corresponding to an 8× or 16× link every clock signal, as applicable.

Figure 8:
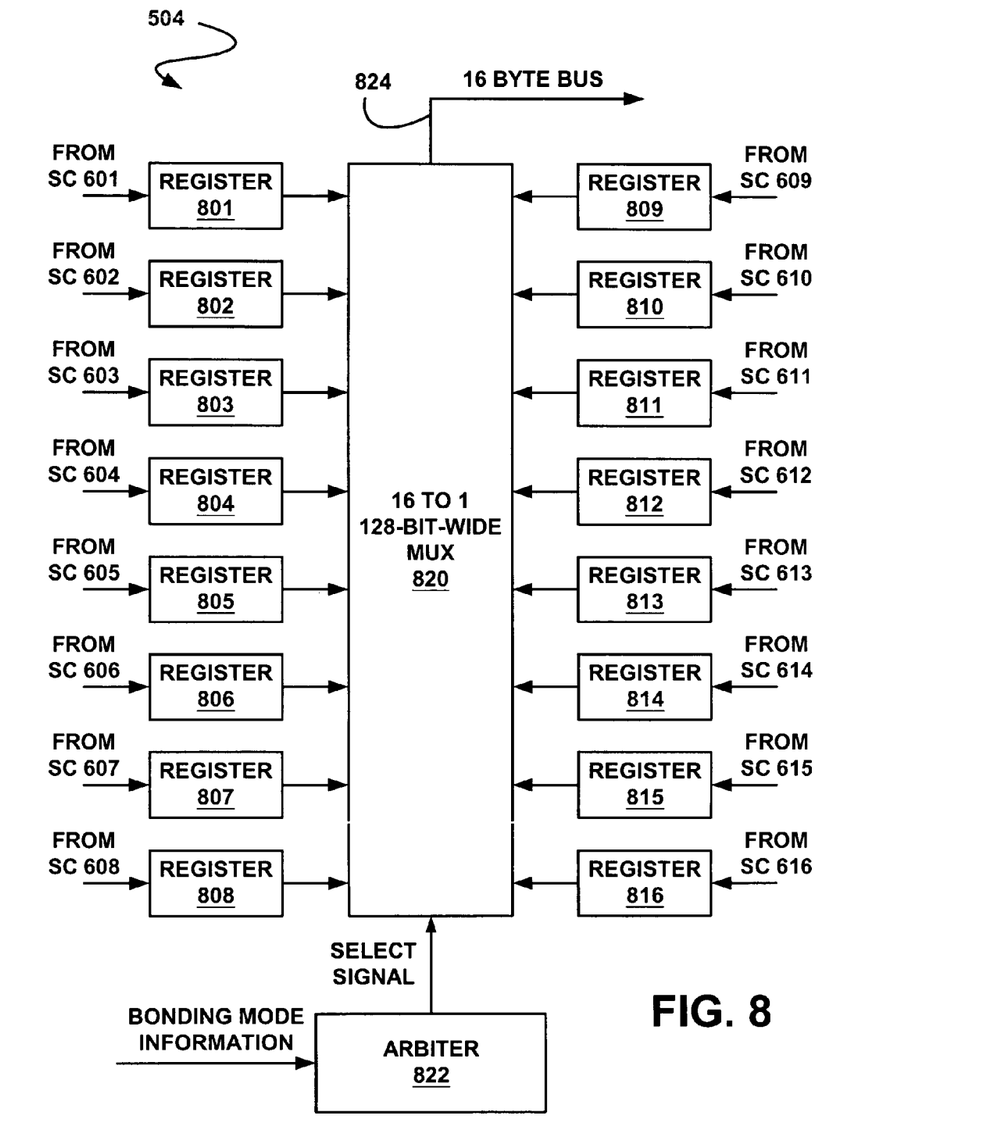
FIG. 8 is a block diagram depicting an embodiment of a data-holding module shown in FIG. 5, according to an embodiment of the invention.

FIG. 8 is a block diagram depicting an embodiment of a data-transfer module 504. The data-transfer module 504 comprises registers 801-816, a multiplexer 820, and an arbiter 822. The multiplexer 820 (a 16-to-1, 128-bit-wide multiplexer) is coupled to the registers 801-816. An output bus 824 is coupled to the multiplexer 820. The output bus 824 accommodates 16-bytes of data and is connected to the error detect module 306, the data multiplexer 308, and the address-buffer module 312 (FIG. 3). The arbiter 822 is preferably a 16-channel round-robin weighted arbiter.

Each of the registers 801-816 receives a 12 or 16-byte data unit from a respective one of the input-staging circuits 601-616 (FIG. 6). This data unit can be held by a respective register 801-816 while a corresponding input-staging circuit 601-616 is receiving the next block of data. The arbiter 822 ensures that the content of the registers 801-816 will be selected and processed before the registers 801-816 are loaded with additional data from the input-staging circuits 601-616. The arbiter 822 will select a register corresponding to a 1× link every 16 clock signals, a register corresponding to a 2× link every 8 clock signals, a register corresponding to a 4× link every 4 clock signals, a register corresponding to a 8× link every 2 clock signals, and a register corresponding to a 16× link (e.g., register 801) every clock signal, as applicable. CRC data may be stored in the top 4-bytes of each of the registers 801-816, and then sent to the error detect block on the upper 4-bytes of the output bus 824.

Figure 9:
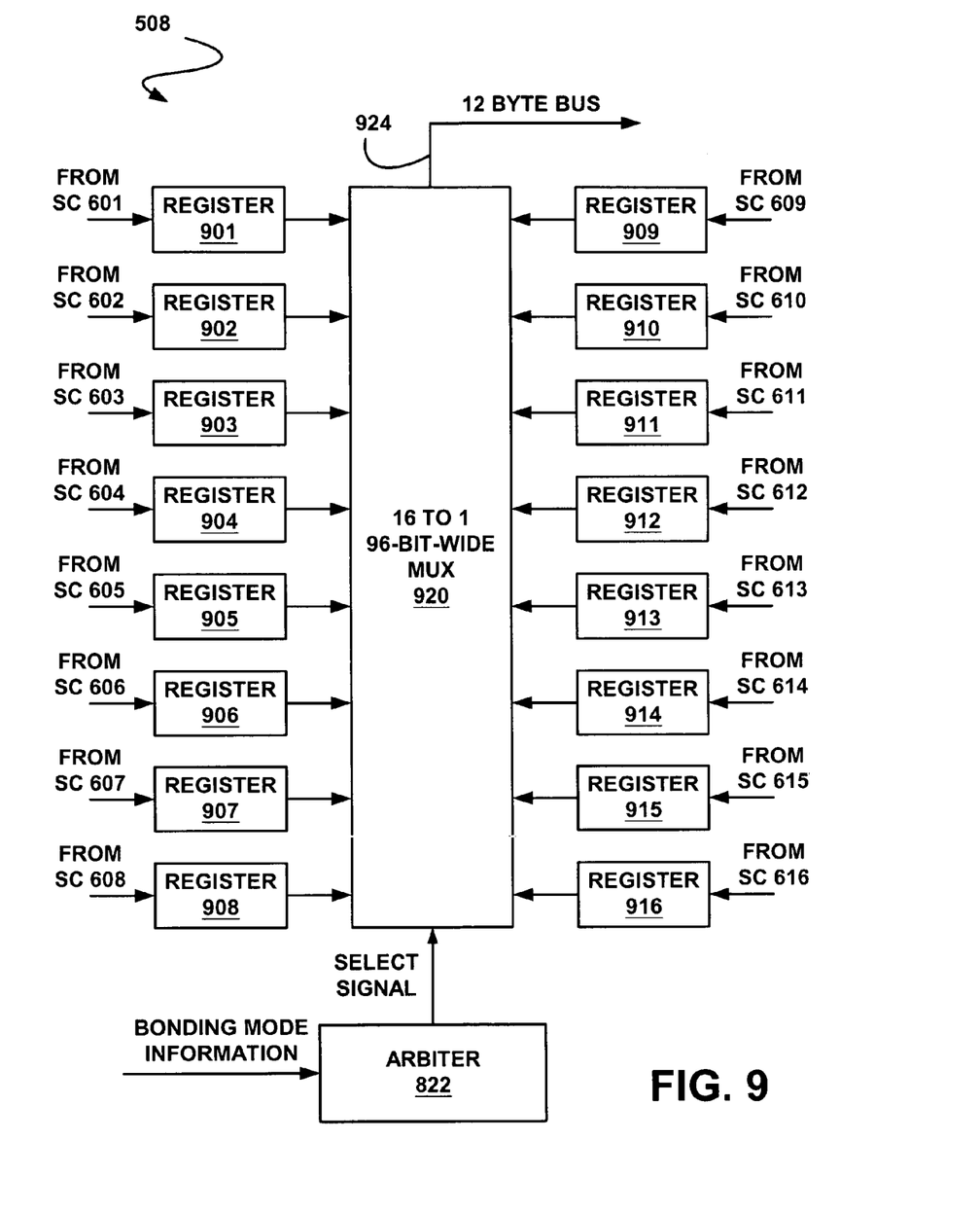
FIG. 9 is a block diagram depicting an embodiment of another data-holding module shown in FIG. 5, according to an embodiment of the invention.

FIG. 9 is a block diagram depicting an embodiment of a data-transfer module 508. The data-transfer module 508 comprises registers 901-916, a multiplexer 920, and an arbiter 822. The multiplexer 920 (a 16-to-1, 96-bit-wide multiplexer) is coupled to the registers 901-916. An output bus 924 is coupled to the multiplexer 920. The output bus 924 accommodates 12-bytes of data and is connected to the error detect module 306 and the data multiplexer 308 (FIG. 3). The arbiter 822 is preferably a 16-channel round-robin weighted arbiter.

Each of the registers 901-916 receives a data unit from a respective one of the input-staging circuits 601-616 (FIG. 6). This data unit may comprise either 0, 4 or 8-bytes of payload data plus a 4-byte CRC. The CRC may be located in bytes 0-3, 4-7 or 8-11 depending upon the amount of payload data. Data can be held by each of the registers 901-916 while the input-staging circuits 601-616 are receiving additional blocks of data. The arbiter 822 ensures that the content of the registers 901-916 will be selected and processed before the registers 901-916 are loaded with additional data from the input-staging circuits 601-616. The arbiter 822 will select a register corresponding to a 1× link every 16 clock signals, a register corresponding to a 2× link every 8 clock signals, a register corresponding to a 4× link every 4 clock signals, a register corresponding to a 8× link every 2 clock signals, and a register corresponding to a 16× link (e.g., register 901) every clock signal, as applicable. CRC data may be stored in the top 4-bytes of each of the registers 901-916, and then sent to the error detect block on the upper 4-bytes of the output bus 924.

Figure 10:
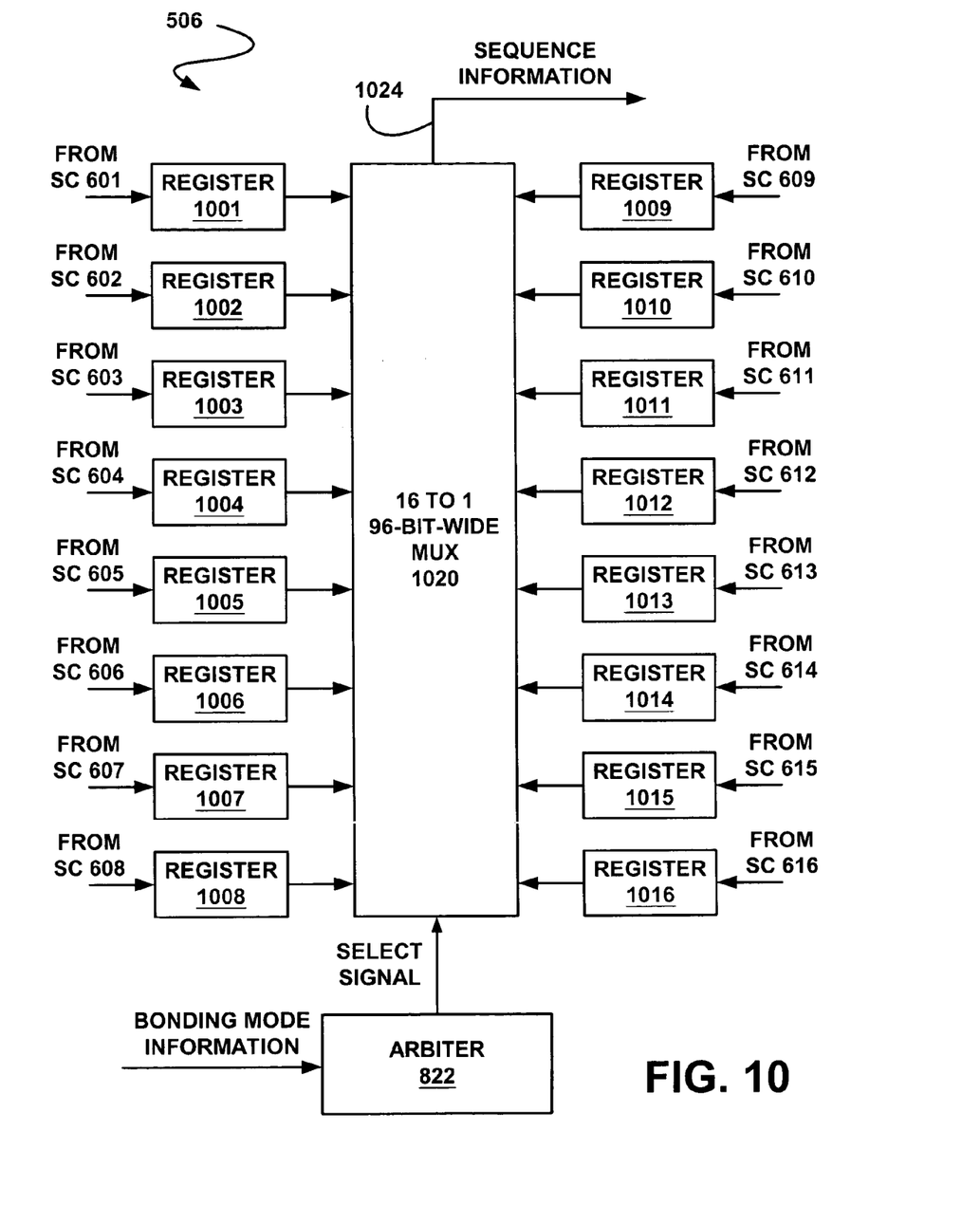
FIG. 10 is a block diagram depicting an embodiment of the sequence module shown in FIG. 5, according to an embodiment of the invention.

FIG. 10 is a block diagram depicting an embodiment of a sequence module 506. The sequence module 506 comprises registers 1001-1016 and a multiplexer 1020. The multiplexer 1020 (a 16-to-1, 96-bit-wide multiplexer) is coupled to the registers 1001-1016 and to an output bus 1024. Each of the registers 1001-1016 is used to hold a 2-byte sequence value for memory read and write messages. Each 2-byte sequence value is received from a 2-byte output port of a respective input-staging circuit 601-616 (FIG. 6). The output 1024 of the sequence module 1000 is provided to the link-control module 304 and to the error detect module 306 (FIG. 3).

What we claim is:

1. A method comprising:
   determining at least one characteristic of a first input/output (I/O) device that is coupled to a memory device interface, the memory device interface being configured to enable data transfers between the first I/O device and a memory device;
   providing buffer allocation information to the first I/O device responsive to the at least one characteristic of the first I/O device;
   buffering data corresponding to the first I/O device in a first portion of a buffer of the memory device interface, a size of the first portion corresponding to the buffer allocation information provided to the first I/O device;
   determining at least one characteristic of a second I/O device that is coupled to the memory device interface;
   providing buffer allocation information to the second I/O device responsive to the at least one characteristic of the second I/O device; and
   buffering data corresponding to the second I/O device in a second portion of the buffer, a size of the second portion corresponding to the buffer allocation information provided to the second I/O device.

2. The method of claim 1, further comprising:
   receiving data from the first I/O device via a first data transfer link; and
   receiving data from the second I/O device via a second data transfer link.

3. The method of claim 1, further comprising:
   receiving a first data unit from the first I/O device;
   buffering the first data unit in the first portion of the buffer;
   transferring the first data unit to the memory device;
   receiving a second data unit from the second I/O device;
   buffering the second data unit in the second portion of the buffer; and
   transferring the second data unit to the memory device.

4. The method of claim 1, wherein the at least one characteristic comprises at least one of:
   a rate at which the I/O device is able to read data from the memory device;
   a rate at which the I/O device is able to write data to the memory device;
   a bandwidth of a link coupled between the I/O device and the memory device interface;
   a size of a data unit that the I/O device reads from the memory device per read request;
   a size of a data unit that the I/O device writes to the memory device per write request;
   a tolerance that the I/O device has for a delay by the memory device interface in fulfilling a write request; or
   a tolerance that the I/O device has for a delay by the memory device interface in fulfilling a read request.

5. A method for allocating buffer capacity in a memory device interface that is configured to transfer data between an input/output (I/O) device and a memory device, the method comprising:
   providing allocated buffering capacity to a first I/O device that provides data to the memory device interface via a first data transfer link;
   buffering data received via the first data transfer link in a first portion of a buffer of the memory device interface;
   providing allocated buffering capacity to a second I/O device that provides data to the memory device interface via a second data transfer link;
   buffering data received via the second data transfer link in a second portion of the buffer, the allocated buffering capacity of the first portion being different than the allocated buffering capacity of the second portion; and
   wherein the allocated buffering capacity of the first portion is responsive to at least one characteristic of the first I/O device and the allocated buffering capacity of the second portion is responsive to at least one characteristic of the second I/O device.

6. The method of claim 5, further comprising:
   receiving a first data unit from the first I/O device via the first data transfer link;
   buffering the first data unit in the first portion of the buffer;
   transferring the first data unit to the memory device;
   receiving a second data unit from the second I/O device via the second data transfer link;
   buffering the second data unit in the second portion of the buffer; and
   transferring the second data unit to the memory device.

7. The method of claim 5, further comprising:
   receiving a first data unit from the memory device;
   buffering the first data unit in the first portion of the buffer;
   transferring the first data unit to the first I/O device;
   receiving a second data unit from the memory device;
   buffering the second data unit in the second portion of the buffer; and
   transferring the second data unit to the second I/O device.

8. A memory device interface that is configured to enable data transfers between an input/output (I/O) device, the memory device interface comprising:
   a buffer;

a first plurality of registers that are configured to enable the memory device interface to buffer in a first portion of the buffer data corresponding to a first I/O device;

a first buffer allocation counter that specifies a buffer allocation value that is configured to enable data received from the first I/O device to be buffered in the first portion of the buffer;

a second plurality of registers that are configured to enable the memory device interface to buffer in a second portion of the buffer data corresponding to a second I/O device, a size of the first portion of the buffer being different than a size of the second portion of the buffer; and a second buffer allocation counter that specifies a buffer allocation value that is configured to enable data received from the second I/O device to be buffered in the second portion of the buffer.

9. The memory device interface of claim 8, wherein the buffer comprises random access memory (RAM).

10. The memory device interface of claim 9, wherein the value of the first buffer allocation counter is decremented responsive to a buffer allocation value being sent to the first I/O device.

11. The memory device interface of claim 10, wherein the value of the first buffer allocation counter is incremented responsive to data being read from the first portion of the buffer.

12. A memory device interface comprising:

a buffer;

a first plurality of registers that are configured to enable the memory device interface to buffer in a first portion of the buffer data received via a first data transfer link;

a first buffer allocation counter that specifies a buffer allocation value that is configured to enable data received via the first data transfer link to be buffered in the first portion of the buffer;

a second plurality of registers that are configured to enable the memory device interface to buffer in a second portion of the buffer data received via a second data transfer link, a size of the first portion of the buffer being different than a size of the second portion of the buffer; and a second buffer allocation counter that specifies a buffer allocation value that is configured to enable data received via the second data transfer link to be buffered in the second portion of the buffer.

13. The memory device interface of claim 12, wherein the buffer comprises random access memory (RAM).

14. The memory device interface of claim 12, wherein the first data transfer link is coupled to a first input/output (I/O) device, and the second data transfer link is coupled to a second I/O device.

15. A system comprising:

means for determining at least one characteristic of a first input/output (I/O) device and at least one characteristic of a second I/O device, the first and second I/O devices coupled to a memory device interface, the memory device interface being configured to enable data transfers between the I/O devices and a memory device;

means for providing buffer allocation information to the first I/O device responsive to the at least one characteristic of the first I/O device and to the second I/O device responsive to the at least one characteristic of the second I/O device;

means for buffering data corresponding to the first I/O device in a first portion of a buffer of the memory device interface, a size of the first portion corresponding to the buffer allocation information provided to the first I/O device; and means for buffering data corresponding to the second I/O device in a second portion of the buffer, a size of the second portion corresponding to the second buffer allocation information provided to the second I/O device.

* * * * *